(12) United States Patent
Yasumoto

(10) Patent No.: US 8,922,483 B2
(45) Date of Patent: Dec. 30, 2014

(54) INFORMATION SYSTEM HAVING CENTRALLY LOCATED CAMERA AND GESTURE RECOGNITION

(71) Applicant: Alpine Electronics, Inc., Tokyo (JP)

(72) Inventor: Takashi Yasumoto, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 115 days.

(21) Appl. No.: 13/889,038

(22) Filed: May 7, 2013

(65) Prior Publication Data

US 2014/0062858 A1 Mar. 6, 2014

(30) Foreign Application Priority Data

Aug. 29, 2012 (JP) ................................. 2012-188463

(51) Int. Cl.
*G09G 5/00* (2006.01)
*G06F 3/01* (2006.01)

(52) U.S. Cl.
CPC ...................................... *G06F 3/017* (2013.01)
USPC .......................................... 345/156; 345/158

(58) Field of Classification Search
CPC ........... G06F 3/01; G06F 3/011; G06F 3/017; G06K 3/00355; G06K 9/00375
USPC ................................... 345/156–169, 173–178
See application file for complete search history.

(56) References Cited

U.S. PATENT DOCUMENTS

| 6,868,383 B1 * | 3/2005 | Bangalore et al. ............ 704/254 |
| 7,770,136 B2 * | 8/2010 | Beeck et al. ................. 715/863 |
| 2011/0199292 A1 * | 8/2011 | Kilbride ........................ 345/156 |
| 2011/0239118 A1 | 9/2011 | Yamaoka et al. |

FOREIGN PATENT DOCUMENTS

| JP | 2003-346162 | 12/2003 |
| JP | 2009-294843 | 12/2009 |
| JP | 2011-204019 | 10/2011 |

\* cited by examiner

*Primary Examiner* — Vijay Shankar
(74) *Attorney, Agent, or Firm* — Brinks Gilson & Lione

(57) ABSTRACT

An information system includes a camera located at a central position in a horizontal direction in front of two users who face the camera and who are aligned side by side, a gesture recognizing unit configured to recognize a gesture of a hand of a user based on a target image captured by the camera, a determining unit that determines whether a central point in a width direction of an arm in the target image is at a right side or at a left side with respect to a center of the hand in the target image, and an operation user configured to determine that a performer of the gesture is a right side or a left side user.

20 Claims, 5 Drawing Sheets

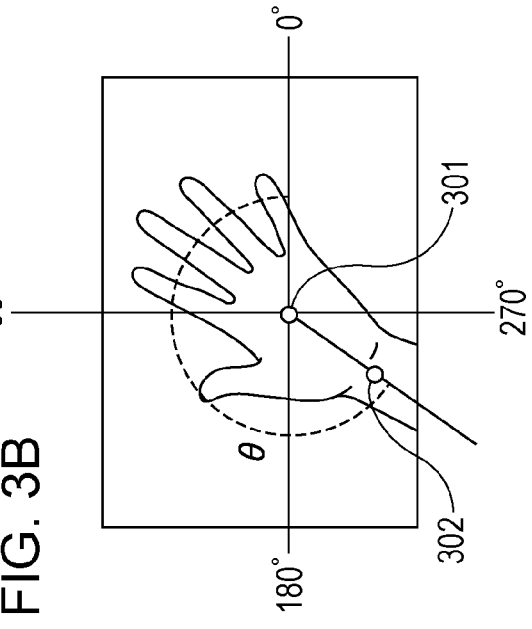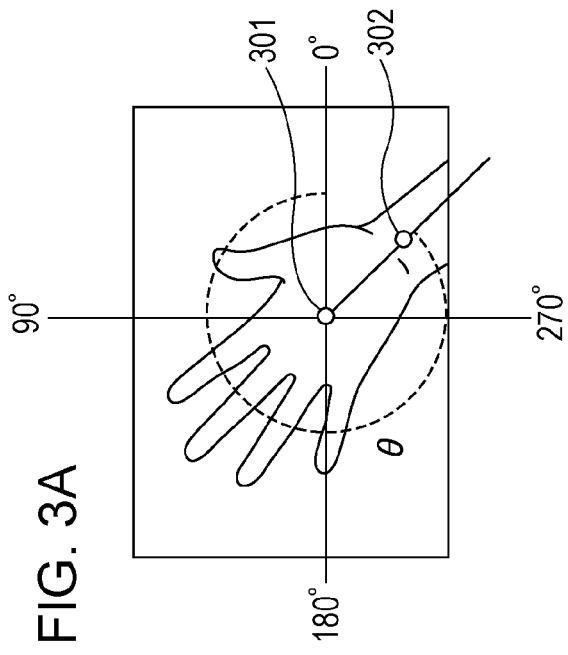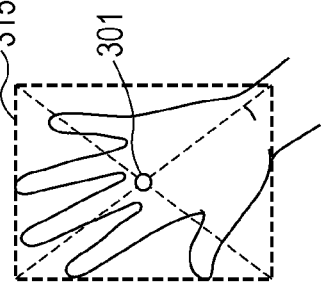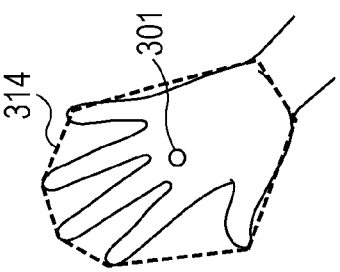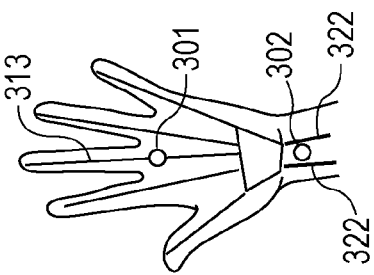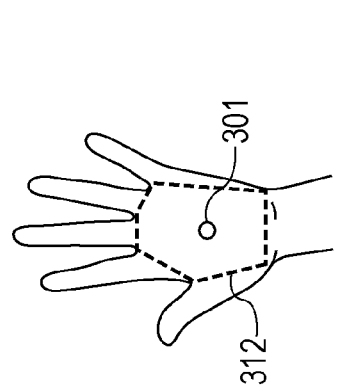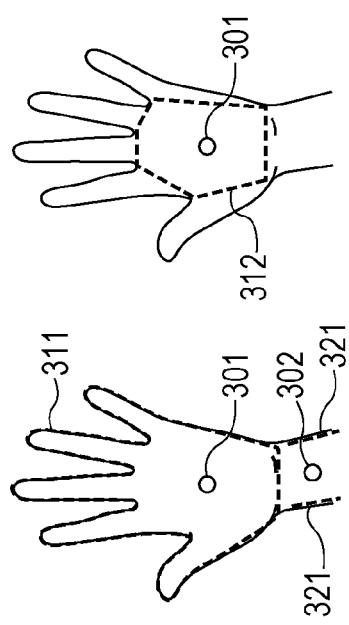

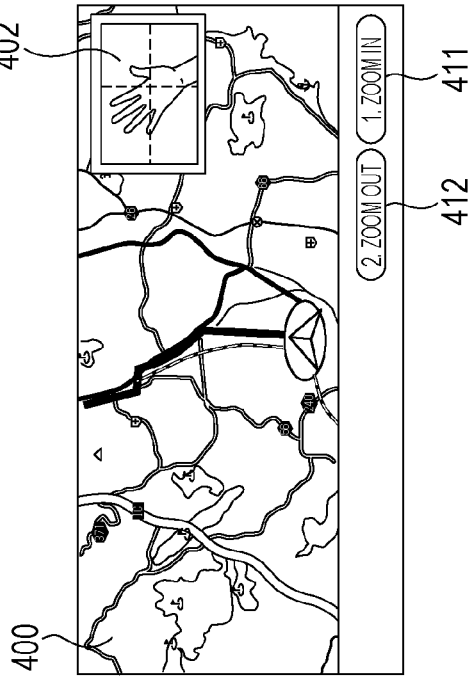
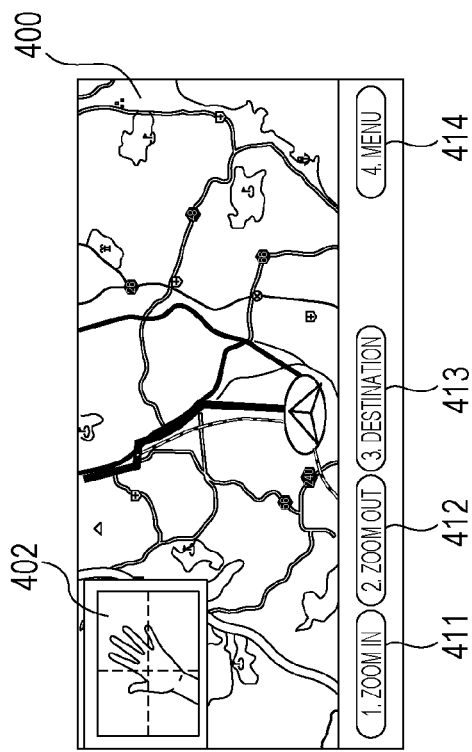
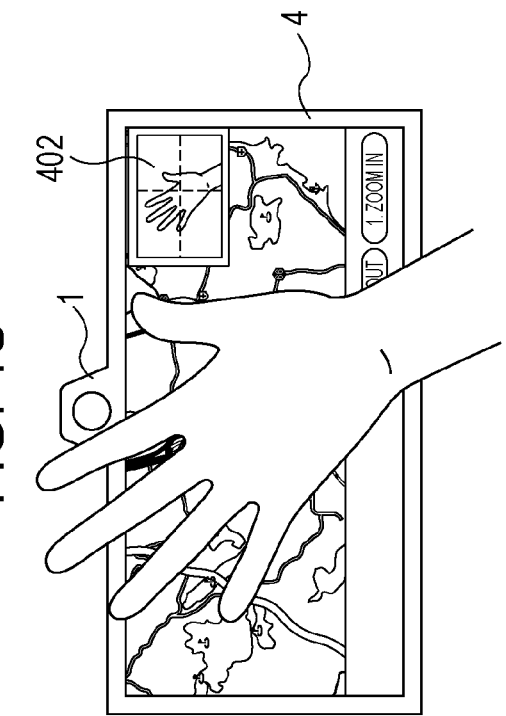
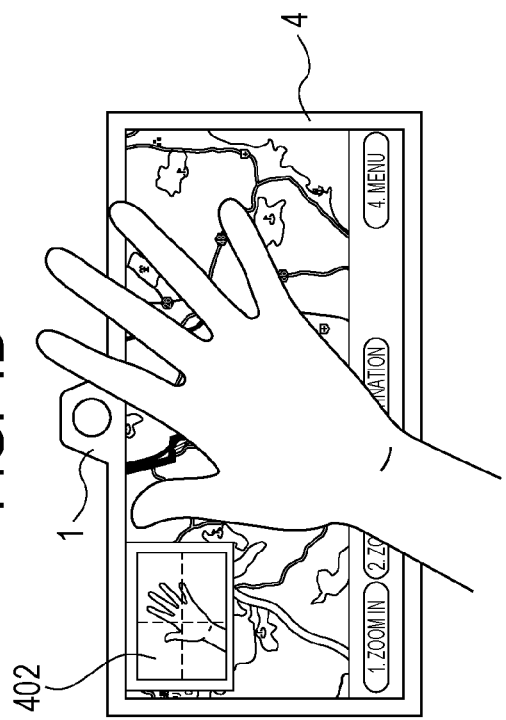

INFORMATION SYSTEM HAVING CENTRALLY LOCATED CAMERA AND GESTURE RECOGNITION

PRIORITY CLAIM

This application claims the benefit of Japanese Patent Application No. 2012-188463 filed on Aug. 29, 2012, and which is incorporated by reference herein in its entirety.

BACKGROUND

1. Field of the Invention

Embodiments of the present invention relate to identifying an operator, who provides an input in the form of a gesture, in an information system that accepts input by a user with a gesture.

2. Description of the Related Art

Information systems accepting inputs by users with gestures, include a system that is provided with a camera taking a picture of a hand of a user, recognizes a gesture of the hand of the user from the picture taken by the camera, and executes a process corresponding to the recognized gesture (for example, refer to Japanese Unexamined Patent Application Publication NO. 2011-204019).

Technologies to identify operators, which are performers of inputs, in an information systems include a technology, in an information system that is mounted in an automobile and that includes an input apparatus arranged between the driver seat and the passenger seat of the automobile and a camera capturing an image downward from above the input apparatus, to determine whether an operator is a driver seat user or a passenger seat user from the orientation in the horizontal direction of an arm of the operator in an image captured by the camera (for example, Japanese Unexamined Patent Application Publication No. 2009-294843).

Technologies to recognize gestures of hands from images captured by cameras include a technology to recognize, for example, the area of a hand, the area of fingers, the features of the skeleton of the hand, and/or the number of extending fingers from an image of the hand captured by the camera (for example, Japanese Unexamined Patent Application Publication No. 2003-346162).

When the camera that takes a picture of a hand of a user is provided in an information system mounted in an automobile and input of gestures of hands of both the driver seat user and the passenger seat user is accepted on the basis of pictures taken by the camera, it is preferred that the camera be arranged in front of the front seat of the automobile and an image of the rear side be captured substantially in the horizontal direction with the camera. This is because the above arrangement and the above capturing manner allow the gestures of the hands of the users, which are oriented forward, to be successfully identified on the basis of the captured images and the gestures of the hands oriented forward are natural for the users.

In contrast, when the camera capturing an image downward from above is provided, as in the case described above, and it is determined whether the operator is the driver seat user or the passenger seat user from the orientation in the horizontal direction of the arm of the operator in the image captured by the camera, it is necessary to prepare the camera that captures an image of an arm of each user downward from above, in addition to the camera that captures an image of a hand of each user backward from forward.

SUMMARY

Accordingly, it is an object of certain embodiments of the present invention to identify an operator, who is a performer of input, in addition to a gesture of a hand of a user, on the basis of an image captured by a camera that captures an image of the hand of the user from the front side of the user.

According to an embodiment of the present invention, an information system includes a camera that is arranged at a central position in a horizontal direction in front of two users who face forward and who are aligned side by side so as to capture a rear image; a gesture recognizing unit that recognizes a gesture of a hand of a user in an image captured by the camera; a determining unit that determines whether a central point in a width direction of an arm in a target image, which is the image including the gesture recognized by the gesture recognizing unit, is at a right side or at a left side with respect to a center of the hand in the target image; and an operation user identifying unit that determines that a performer of the gesture is a right side user if the determining unit determines that the central point in the width direction of the arm in the target image is at the right side with respect to the center of the hand in the target image and determines that the performer of the gesture is a left side user if the determining unit determines that the central point in the width direction of the arm in the target image is at the left side with respect to the center of the hand in the target image.

In the information system, specifically, for example, the determining unit may determine whether the central point in the width direction of the arm in the target image is at the right side or at the left side with respect to the center of the hand in the target image on the basis of an angle of the direction from the center of the hand in the target image to the central point in the width direction of the arm in the target image.

According to another embodiment of the present invention, an information system includes a camera that is arranged at a central position in a horizontal direction in front of two users who face forward and who are aligned side by side so as to capture a rear image; a gesture recognizing unit that recognizes a gesture of a hand of a user in an image captured by the camera; and an operation user identifying unit that determines whether the hand the gesture of which is recognized enters an image capturing range of the camera from a right side or from a left side on the basis of an image that has been captured by the camera before the image including the gesture of the hand recognized by the gesture recognizing unit and determines that a performer of the gesture is a right side user if the hand enters the image capturing range of the camera from the right side and that the performer of the gesture is a left side user if the hand enters the image capturing range of the camera from the left side.

With the above information systems, it is possible to determine the performer of the gesture without providing another camera and another sensor in addition to the camera provided in front of the two users who face forward and who are aligned side by side so as to capture a rear image.

The information system may further include a display apparatus, and a reference image display unit that displays the image captured by the camera in the display apparatus as a reference image. The reference image display unit may display the reference image at a right side position on a display screen of the display apparatus if the operation user identifying unit determines that the performer of the gesture is the right side user and may display the reference image at a left side position on the display screen of the display apparatus if the operation user identifying unit determines that the performer of the gesture is the left side user.

The display of the reference image in the above manner allows the user performing the gesture to visually recognize the reference image without being blocked with his/her hand. It is possible for the user to view the reference image that is visually recognized to determine whether his/her hand is appropriately positioned within the image capturing range of the camera.

The information system may further include a control unit that monitors recognition of a certain gesture, which is set in advance as an input start gesture, by the gesture recognizing unit, accepts an operation gesture, which is recognized by the gesture recognizing unit, as a user operation associated with the operation gesture when the input start gesture is recognized by the gesture recognizing unit, and executes a process corresponding to the accepted user operation. The control unit may not accept the operation gesture as the user operation if the user identified by the operation user identifying unit as the performer of the input start gesture is different from the user identified by the operation user identifying unit as the performer of the operation gesture.

With the above configuration, it is possible to inhibit the operation by a performer different from the performer who has first performed the operation with the input of a gesture from being accepted as the operation by the performer who has first performed the operation with the input of a gesture when the operation to be accepted is varied with the performer.

According to another embodiment of the present invention, an information system includes a camera that is arranged at a central position in a horizontal direction in front of two users who face forward and who are aligned side by side so as to capture a rear image; a display apparatus; a gesture recognizing unit that recognizes a gesture of a hand of a user in an image captured by the camera; an operation user identifying unit that determines whether a performer of the gesture recognized by the gesture recognizing unit is a right side user or a left side user; and a reference image display unit that displays the image captured by the camera in the display apparatus as a reference image. The reference image display unit displays the reference image at a right side position on a display screen of the display apparatus if the operation user identifying unit determines that the performer of the gesture is the right side user and displays the reference image at a left side position on the display screen of the display apparatus if the operation user identifying unit determines that the performer of the gesture is the left side user.

With the above information system, the user performing the gesture can visually recognize the reference image without being blocked with his/her hand. It is possible for the user to view the reference image that is visually recognized to determine whether his/her hand is appropriately positioned within the image capturing range of the camera.

According to another embodiment of the present invention, an information system includes a camera that is arranged in front of two users who face forward and who are aligned side by side so as to capture a rear image; a gesture recognizing unit that recognizes a gesture of a hand of a user in an image captured by the camera; an operation user identifying unit that determines whether a performer of the gesture recognized by the gesture recognizing unit is a right side user or a left side user; and a control unit that monitors recognition of a certain gesture, which is set in advance as an input start gesture, by the gesture recognizing unit, accepts an operation gesture, which is recognized by the gesture recognizing unit, as a user operation associated with the operation gesture when the input start gesture is recognized by the gesture recognizing unit, and executes a process corresponding to the accepted user operation. The control unit does not accept the operation gesture as the user operation if the user identified by the operation user identifying unit as the performer of the input start gesture is different from the user identified by the operation user identifying unit as the performer of the operation gesture.

With the above information system, it is possible to inhibit the operation by a performer different from the performer who has first performed the operation with the input of a gesture from being accepted as the operation by the performer who has first performed the operation with the input of a gesture when the operation to be accepted is varied with the performer.

Each of the above information systems may be mounted in an automobile. The two users may be a user sitting on a driver seat of the automobile and a user sitting on a passenger seat of the automobile. The camera may be arranged at a central position in the horizontal direction between the driver seat and the passenger seat in front of the driver seat and the passenger seat so as to capture a rear image.

According to the present invention, it is possible to identify an operator, who is a performer of input, in addition to a gesture of a hand of a user, on the basis of an image captured by a camera that captures an image of the hand of the user from the front side of the user.

BRIEF DESCRIPTION OF THE DRAWINGS

FIGS. 3A, 3B, and 3C1 to 3C5 illustrate how a gesture is determined according to embodiments of the present invention;

FIGS. 4A to 4D illustrate an example of how a display window is displayed according to an embodiment of the present invention.

DETAILED DESCRIPTION

Embodiments of the present invention will herein be described with reference to the attached drawings.

Figure 1A:
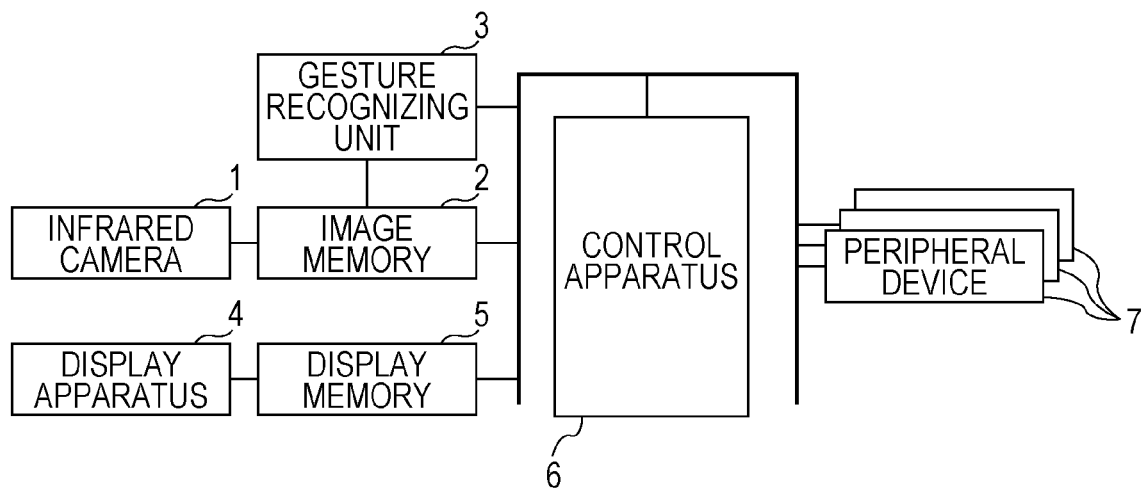
FIG. 1A is a block diagram illustrating an exemplary configuration of an information system according to an embodiment of the present invention.

FIG. 1A is a block diagram illustrating an exemplary configuration of an information system according to an embodiment of the present invention.

The information system is a system mounted in an automobile. The information system is, for example, an audio-video (AV) system or a navigation system.

Referring to FIG. 1A, the information system includes an infrared camera 1, an image memory 2 that stores images captured by the infrared camera 1, a gesture recognizing unit 3, a display apparatus 4, a display memory 5 that stores images to be displayed in the display apparatus 4, a control apparatus 6, and one or more peripheral devices 7.

However, such an information system may be composed of a computer including a central processing unit (CPU) and a memory. In this case, for example, the control apparatus 6 and/or the gesture recognizing unit 3 may be realized by the computer that executes certain computer programs.

Figure 1B:
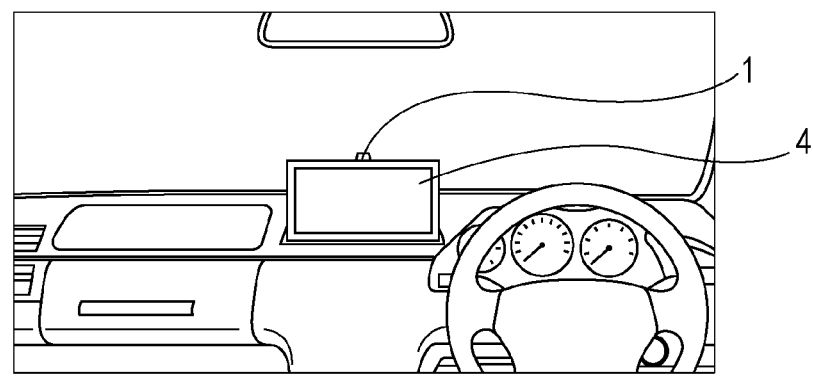
FIG. 1B illustrates how an infrared camera and a display apparatus in the information system are mounted in an automobile.

The display apparatus 4 is, for example, a liquid crystal display and is arranged at an intermediate position in the horizontal direction between the driver seat and the passenger seat on a dashboard, as illustrated in FIG. 1B.

The infrared camera 1 is arranged so as to capture a rear image at a central position in the horizontal direction on the display apparatus 4, as illustrated in FIG. 1B.

An image captured by the infrared camera 1, which is oriented backward, is mirror-reversed so that the horizontal direction of the image coincides with the horizontal direction viewed from a user and is stored in the image memory 2.

The types of gestures of a hand to be recognized by the gesture recognizing unit 3 are registered in advance in the gesture recognizing unit 3. The gesture recognizing unit 3 recognizes the type of each gesture of the hand from the picture taken by the infrared camera 1, which is represented by the image stored in the image memory 2, and supplies the recognized type of the gesture to the control apparatus 6 as a recognized gesture.

When the information system is an AV system, the peripheral devices 7 include, for example, a broadcast receiver; a disk drive that plays back an image recorded on a recording disk, such as a compact disc (CD) or a digital versatile disk (DVD); and an audio output device provided with a speaker. In this case, the control apparatus 6 performs, for example, a process to control the operation of the broadcast receiver or the disk drive, a process to output an audio received by the broadcast receiver or an audio recorded on the recording disk loaded in the disk drive to the audio output device, and/or a process to output a video received by the broadcast receiver or a video recorded on the recording disk loaded in the disk drive to the display apparatus 4 while the control apparatus 6 is displaying an appropriate graphical user interface (GUI) screen in the display apparatus 4 and is accepting the recognized gesture supplied from the gesture recognizing unit 3 as an operation of the user.

When the information system is a navigation system, the peripheral devices 7 include, for example, a storage device that stores map data, a global positioning system (GPS) receiver, and a sensor that detects a vehicle speed or an angular velocity of the automobile. In this case, the control apparatus 6 performs, for example, a process to calculate the current position, a process to set a destination, a process to set a route to the destination, a process to display a navigation image representing the current position, the destination, and the route on a map in the display apparatus 4, and/or scroll display of the navigation image while the control apparatus 6 is displaying an appropriate GUI screen in the display apparatus 4 and is accepting the recognized gesture supplied from the gesture recognizing unit 3 as an operation of the user.

A gesture input accepting process executed by the control apparatus 6 in order to perform the above operations will now be described.

Figure 2:
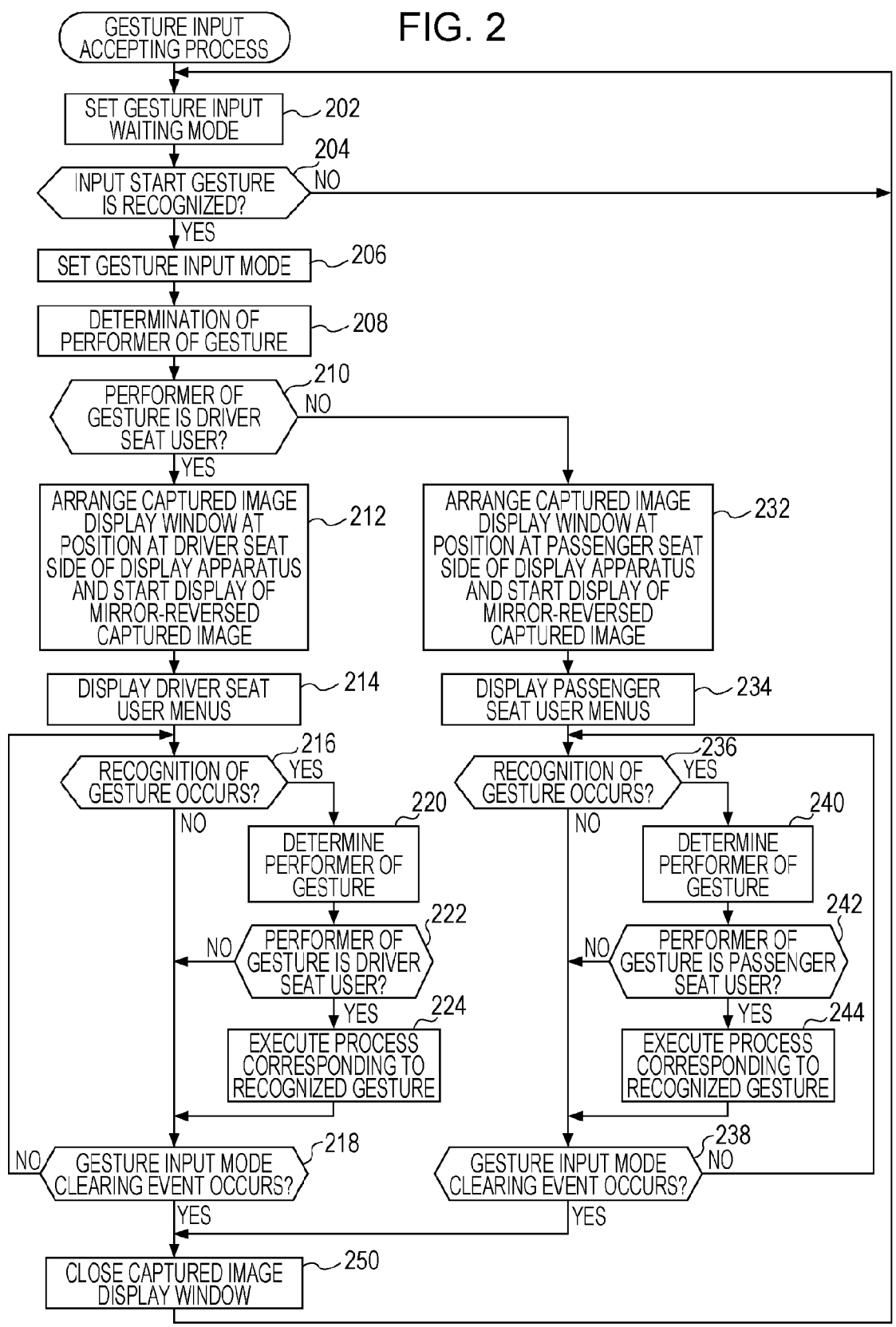
FIG. 2 is a flowchart illustrating an example of a gesture input accepting process according to an embodiment of the present invention.

FIG. 2 is a flowchart illustrating an example of the gesture input accepting process.

Referring to FIG. 2, in Step 202, a gesture input waiting mode is set in the gesture recognizing unit 3.

During a period in which the gesture input waiting mode is set, the gesture recognizing unit 3 performs gesture recognition by using only the gesture having the type that is set in advance as an input start gesture as a recognition target and, upon recognition of the input start gesture, supplies the input start gesture to the control apparatus 6 as the recognized gesture.

A hand in which all the fingers are opened (so called paper in paper-rock-scissors) is used as the input start gesture in the present embodiment. Specifically, in the gesture input waiting mode, the gesture recognizing unit 3 recognizes any picture of a hand in which all the fingers are opened, captured by the infrared camera 1, and supplies the input start gesture to the control apparatus 6 as the recognized gesture.

In Step 204, the control apparatus 6 determines whether the input start gesture recognized by the gesture recognizing unit 3 is input as the recognized gesture. If the control apparatus 6 determines that the input start gesture is input as the recognized gesture (YES in Step 204), in Step 206, the control apparatus 6 sets a gesture input mode in the gesture recognizing unit 3. If the control apparatus 6 determines that the input start gesture is not input as the recognized gesture (NO in Step 204), the process goes back to Step 202.

During a period in which the gesture input mode is set, the gesture recognizing unit 3 performs the gesture recognition by using all the types of hand gestures to be recognized, which are registered in advance, as the recognition targets and supplies the type of the recognized gesture to the control apparatus 6 as the recognized gesture.

In Step 208, the control apparatus 6 determines whether the performer of the input start gesture that is recognized is the driver seat user or the passenger seat user.

The determination of the performer of the input start gesture is performed in the following manner.

First, an image in which the input start gesture is recognized by the gesture recognizing unit 3 is acquired from the image memory 2.

Then, a center point 301 of a hand and a central point 302 of an arm in the width direction in each of the pictures of hands included in images that are acquired, as illustrated in FIG. 3A and FIG. 3B, are calculated.

It is assumed here that the driver seat is the right seat and the passenger seat is the left seat. The arm is on the left side of the hand if the hand the picture of which is taken is a hand of the passenger seat user positioned at the left side of the infrared camera 1, and the arm is on the right side of the hand if the hand the picture of which is taken is a hand of the driver seat user positioned at the right side of the infrared camera 1.

Accordingly, the performer of the input start gesture is determined to be the passenger seat user if the central point 302 of the arm is at the left side of the center point 301 of the hand, and the performer of the input start gesture is determined to be the driver seat user if the central point 302 of the arm is at the right side of the center point 301 of the hand.

For example, it is assumed that the right direction is set as zero degrees and the angle is measured counterclockwise, as in FIG. 3A and FIG. 3B. It is determined that the performer of the input start gesture is the driver seat user if a direction θ from the center point 301 of the hand to the central point 302 of the arm has a value between zero degrees and 90 degrees or a value between 270 degrees and zero degrees, as illustrated in FIG. 3A. It is determined that the performer of the input start gesture is the passenger seat user if the direction θ from the center point 301 of the hand to the central point 302 of the arm has a value between 90 degrees and 270 degrees, as illustrated in FIG. 3B.

Each of the images illustrated in FIG. 3A and FIG. 3B results from mirror reverse of the image captured by the infrared camera 1. The left side and the right side of the image coincide with the left side and the right side viewed from the user.

The center point 301 of the hand may be calculated by various methods. For example, the centroid of an image area 311 recognized as the hand by the gesture recognizing unit 3 may be set as the center point 301 of the hand, as illustrated in FIG. 3C1, or the centroid of an image area 312 recognized as a palm by the gesture recognizing unit 3, that is, the centroid of the image area 312 resulting from exclusion of an image area recognized as the fingers from an image area recognized as the hand may be set as the center point 301 of the hand, as illustrated in FIG. 3C2.

Alternatively, when the skeleton of the hand is recognized by the gesture recognizing unit 3, the position of the third knuckle of the middle finger in a skeleton 313 that is recognized may be set as the center point 301 of the hand, as illustrated in FIG. 3C3. Alternatively, the centroid of an area 314 by which the image portion recognized as the hand by the gesture recognizing unit 3 is circumscribed may be set as the center point 301 of the hand, as illustrated in FIG. 3C4. Alternatively, the center of a quadrangle 315 by which the image portion recognized as the hand by the gesture recognizing unit 3 is circumscribed may be set as the center point 301 of the hand, as illustrated in FIG. 3C5.

In the calculation of the central point 302 of the arm, an intermediate point in a direction orthogonal to the straight lines of two linear edges 321 that are substantially parallel to each other within an area where the arm possibly exists, compared to the area of the hand and the area of the fingers, may be calculated as the central point 302 of the arm, as illustrated in FIG. 3C1. Alternatively, when the skeleton including the arm is recognized by the gesture recognizing unit 3, a midpoint in the width direction of the arm in a skeleton 322 of the arm may be calculated as the central point 302 of the arm, as illustrated in FIG. 3C3.

The determination of the performer of the gesture the image of which is captured by the infrared camera 1 in the above manner allows the performer of the gesture to be determined without providing another camera and another sensor in addition to the infrared camera 1 provided for recognition of the gesture.

Referring back to FIG. 2, in the determination of whether the performer of the input start gesture is the driver seat user or the passenger seat user (Step 208), in Step 210, the control apparatus 6 determines whether the performer of the input start gesture is the driver seat user. If the control apparatus 6 determines that the performer of the input start gesture is the driver seat user (YES in Step 210), the process goes to Step 212. If the control apparatus 6 determines that the performer of the input start gesture is the passenger seat user (NO in Step 210), the process goes to Step 232.

In Step 212, a captured image display window 402 is arranged in a small screen shape at a position at the driver seat side on a display screen of the display apparatus 4 (at the right side viewed from the user), as illustrated in FIG. 4A, and display of the image captured by the infrared camera 1 on the captured image display window 402 is started.

In Step 214, predetermined driver seat user operation menus are displayed on the display screen of the display apparatus 4, as illustrated in FIG. 4A. FIG. 4A illustrates an example of how the display screen of the display apparatus 4 is displayed when the information system is a navigation system. In the example in FIG. 4A, a menu 411 indicating that a zoom-in operation of a map on a navigation image is accepted with a gesture in which one finger is raised and a menu 412 indicating that a zoom-out operation of the map on the navigation image is accepted with a gesture in which two fingers are raised are displayed below a navigation image 400.

Then, an occurrence of recognition of a new gesture (an occurrence of input of a new recognized gesture) in the gesture recognizing unit 3 (Step 216) and an occurrence of a gesture input mode clearing event (Step 218) are monitored.

The gesture input mode clearing event is a predetermined event. For example, no occurrence of input of a new recognized gesture over a certain period or an occurrence of a processing sequence that is interactively performed with the user via input of gestures (for example, termination of a destination setting processing sequence in the navigation system or termination of a processing sequence of accepting specification of playback content in the AV system) is used as the gesture input mode clearing event.

In Step 216, it is determined whether input of a new recognized gesture from the gesture recognizing unit 3 occurs. If it is determined that input of a new recognized gesture from the gesture recognizing unit 3 occurs (YES in Step 216), in Step 220, the performer of the gesture recognized by the gesture recognizing unit 3 in the above manner is determined. In Step 222, it is determined whether the performer of the gesture is the driver seat user. If it is determined that the performer of the gesture is not the driver seat user (NO in Step 222), the process goes back to the monitoring in Step 216 and Step 218. If it is determined that the performer of the gesture is the driver seat user (YES in Step 222), in Step 224, an operation that is set in advance as the operation to be accepted with the input recognized gesture is accepted and a process corresponding to the accepted operation is executed. Then, the process goes back to the monitoring in Step 216 and Step 218. If it is determined that input of a new recognized gesture from the gesture recognizing unit 3 does not occur (NO in Step 216), the process goes to Step 218.

In Step 218, it is determined whether the gesture input mode clearing event occurs. If it is determined that the gesture input mode clearing event occurs (YES in Step 218), in Step 250, the captured image display window 402 is closed. Then, the process goes back to Step 202. If it is determined that the gesture input mode clearing event does not occur (NO in Step 218), the process goes back to Step 216.

If the control apparatus 6 determines that the performer of the input start gesture is the passenger seat user (NO in Step 210), in Step 232, the captured image display window 402 is arranged in a small screen shape at a position at the passenger seat side on the display screen of the display apparatus 4 (at the left side viewed from the user), as illustrated in FIG. 4B, and display of the image captured by the infrared camera 1 on the captured image display window 402 is started.

In Step 234, predetermined passenger seat user operation menus are displayed on the display screen of the display apparatus 4, as illustrated in FIG. 4B. FIG. 4B illustrates an example of how the display screen of the display apparatus 4 is displayed when the information system is a navigation system. In the example in FIG. 4B, in addition to the driver seat user operation menus, a menu 413 indicating that an operation to start a destination setting process is accepted with a gesture in which three fingers are raised and a menu 414 indicating that an operation to display another menu is accepted with a gesture in which four fingers are raised are displayed below the navigation image 400 described above.

Then, an occurrence of recognition of a new gesture (an occurrence of input of a new recognized gesture) in the gesture recognizing unit 3 (Step 236) and an occurrence of the gesture input mode clearing event (Step 238) are monitored.

In Step 236, it is determined whether input of a new recognized gesture from the gesture recognizing unit 3 occurs. If it is determined that input of a new recognized gesture from the gesture recognizing unit 3 occurs (YES in Step 236), in Step 240, the performer of the gesture recognized by the gesture recognizing unit 3 in the above manner is determined. In Step 242, it is determined whether the performer of the gesture is the passenger seat user. If it is determined that the performer of the gesture is not the passenger seat user (NO in Step 242), the process goes back to the monitoring in Step 236 and Step 238. If it is determined that the performer of the gesture is the passenger seat user (YES in Step 242), in Step 244, an operation that is set in advance as the operation to be accepted with the input recognized gesture is accepted and a process corresponding to the accepted operation is executed.

Then, the process goes back to the monitoring in Step 236 and Step 238. If it is determined that input of a new recognized gesture from the gesture recognizing unit 3 does not occur (NO in Step 236), the process goes to Step 238.

In Step 238, it is determined whether the gesture input mode clearing event occurs. If it is determined that the gesture input mode clearing event occurs (YES in Step 238), in Step 250, the captured image display window 402 is closed. Then, the process goes back to Step 202. If it is determined that the gesture input mode clearing event does not occur (NO in Step 238), the process goes back to Step 236.

The gesture input accepting process is performed by the control apparatus 6 in the above manner.

The display of the image captured by the infrared camera 1 on the captured image display window 402 is started in Step 212 and Step 232 in the gesture input accepting process in order to allow the user to perform a subsequent gesture at a position where the hand is appropriately captured by the infrared camera 1. Displaying the image captured by the infrared camera 1 in the above manner inhibits the hand from gradually being shifted from the position where the hand is appropriately captured by the infrared camera 1 during the gesture, for example, when a gesture to move the hand from side to side is accepted as the scrolling operation.

In addition, the captured image display window 402 is arranged at the position at the driver seat side (at the right side viewed from the user) on the display screen of the display apparatus 4 in the manner illustrated in FIG. 4A when the performer of the input start gesture is the driver seat user in Step 212 in the gesture input accepting process, and the captured image display window 402 is arranged at the position at the passenger seat side (at the left side viewed from the user) on the display screen of the display apparatus 4 in the manner illustrated in FIG. 4B when the performer of the input start gesture is the passenger seat user in Step 232 in the gesture input accepting process. This is because such arrangement avoids difficult visual recognition or no visual recognition of the image that is displayed on the captured image display window 402 and that is captured by the infrared camera 1 due to the captured image display window 402 that is blocked from the user with the hand of the user performing the gesture, as in cases illustrated in FIG. 4C and FIG. 4D.

FIG. 4C illustrates a case in which the performer of the input start gesture, that is, the user who performs the subsequent gestures is the driver seat user. FIG. 4D illustrates a case in which the performer of the input start gesture, that is, the user who performs the subsequent gestures is the passenger seat user.

Furthermore, when the performer of the recognized gesture is different from the performer of the input start gesture recognized when the gesture input mode is set in Steps 220 to 222 and Steps 240 to 242 in the gesture input accepting process, the operation corresponding to the recognized gesture is not accepted in order to inhibit the operation by a performer different from the performer who has first performed the operation with input of a gesture when the operation to be accepted is varied with the performer performing the input of the gesture. In other words, no acceptance of the operation corresponding to the recognized gesture in the above case allows, for example, the operation with input of a gesture by the driver seat user on any of the passenger seat user operation menus illustrated in FIG. 4B, which are displayed in response to the input start gesture by the passenger seat user, not to be accepted.

Furthermore, the determination of the performer of the gesture may be performed in the following manner in all of Steps 210, 222, and 242 or in part thereof in the gesture input accepting process.

Figure 5B:
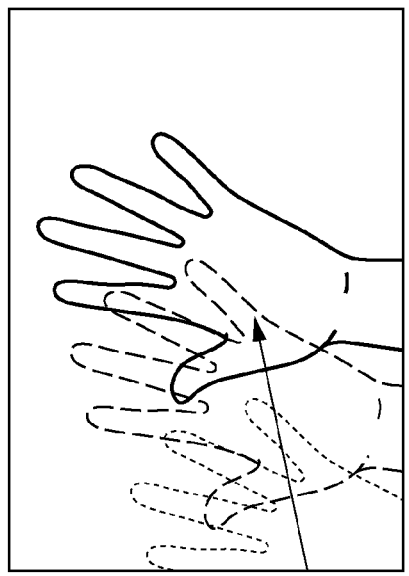
FIGS. 5A and 5B illustrate how the gesture is determined according to an embodiment of the present invention.
Figure 5A:
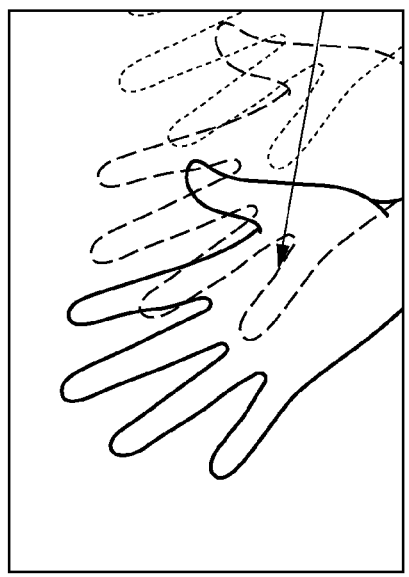

First, for example, first-in first-out (FIFO) method is adopted in the image memory 2 to cause the images captured by the infrared camera 1 during about past ten seconds to be constantly accumulated in the image memory 2. Then, when a gesture is recognized by the gesture recognizing unit 3, it is determined whether the hand the gesture of which is recognized has entered the image capturing range of the infrared camera 1 from the left side or the right side from the past captured images stored in the image memory 2. If the hand has entered the image capturing range from the right side, as illustrated in FIG. 5A, it is determined that the performer is the driver seat user. If the hand has entered the image capturing range from the left side, as illustrated in FIG. 5B, it is determined that the performer is the passenger seat user.

The embodiments of the present invention have been described.

A visible light camera may be used, instead of the infrared camera 1, in the above embodiments.

The above embodiments are similarly applicable to a case in which input of gestures is accepted from two users who are aligned side by side in an arbitrary information system.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims

What is claimed is:

1. An information system comprising:
   a camera located at a central position in a horizontal direction in front of two users who face the camera and who are aligned side by side;
   a gesture recognizing unit configured to recognize a gesture of a hand of a user based on a target image captured by the camera;
   a determining unit that determines whether a central point in a width direction of an arm in the target image, is at a right side or at a left side with respect to a center of the hand in the target image, the target image including the gesture recognized by the gesture recognizing unit; and
   an operation user identifying unit configured to determine that a performer of the gesture is a right side user if the determining unit determines that the central point in the width direction of the arm in the target image is at the right side with respect to the center of the hand in the target image, and configured to determine that the performer of the gesture is a left side user if the determining unit determines that the central point in the width direction of the arm in the target image is at the left side with respect to the center of the hand in the target image.

2. The information system according to claim 1, wherein the determining unit is configured to determine whether the central point in the width direction of the arm in the target image is at the right side or at the left side with respect to the center of the hand on the basis of an angle of a direction from the center of the hand to the central point in the width direction of the arm.

3. The information system according to claim 1, further comprising:
   a display apparatus; and a reference image display unit configured to display the image captured by the camera as a reference image; and wherein the reference image display unit displays the reference image at a right side position on a display screen if the operation user identifying unit determines that the performer of the gesture is the right side user, and is configured to display the reference image at a left side position on the display screen if the operation user identifying unit determines that the performer of the gesture is the left side user.

4. The information system according to claim 1, further comprising:

a control unit configured to monitor recognition of a certain gesture defined to be an input start gesture, and configured to accept an operation gesture as a user operation associated with the operation gesture when the input start gesture is recognized by the gesture recognizing unit, and executes a process corresponding to the accepted user operation; and wherein the control unit does not accept the operation gesture as the user operation if the user identified by the operation user identifying unit as the performer of the input start gesture is different from the user identified by the operation user identifying unit as the performer of the operation gesture.

5. The information system according to claim 1, wherein the information system is mounted in an automobile;

wherein the two users comprise a user sitting on a driver seat of the automobile and a user sitting on a passenger seat of the automobile, and wherein the camera is arranged at a central position in the horizontal direction between the driver seat and the passenger seat.

6. An information system comprising:

a camera that is arranged at a central position in a horizontal direction in front of two users who face forward and who are aligned side by side;

a gesture recognizing unit configured to recognize a gesture of a hand of a user in an image captured by the camera; and an operation user identifying unit configured to determine whether the hand the gesture of which is recognized enters an image capturing range of the camera from a right side or from a left side on the basis of an image captured by the camera, and determines that a performer of the gesture is a right side user if the hand enters the image capturing range of the camera from the right side, and determines that the performer of the gesture is a left side user if the hand enters the image capturing range of the camera from the left side.

7. The information system according to claim 6, further comprising:

a display apparatus;

a reference image display unit configured to display the image captured by the camera as a reference image; and wherein the reference image display unit is configured to display the reference image at a right side position on a display screen if the operation user identifying unit determines that the performer of the gesture is the right side user, and is configured to display the reference image at a left side position on the display screen if the operation user identifying unit determines that the performer of the gesture is the left side user.

8. The information system according to claim 6, further comprising:

a control unit configured to monitor recognition of a certain gesture defined to be an input start gesture, by the gesture recognizing unit, accepts an operation gesture, which is recognized by the gesture recognizing unit, as a user operation associated with the operation gesture when the input start gesture is recognized by the gesture recognizing unit, and executes a process corresponding to the accepted user operation; and wherein the control unit does not accept the operation gesture as the user operation if the user identified by the operation user identifying unit as the performer of the input start gesture is different from the user identified by the operation user identifying unit as the performer of the operation gesture.

9. An information system comprising:

a camera that is arranged at a central position in a horizontal direction in front of two users who face forward and who are aligned side by side;

a display apparatus;

a gesture recognizing unit configured to recognize a gesture of a hand of a user in an image captured by the camera;

an operation user identifying unit configured to determine whether a performer of the gesture recognized by the gesture recognizing unit is a right side user or a left side user;

a reference image display unit that displays the image captured by the camera in the display apparatus as a reference image; and wherein the reference image display unit is configured to display the reference image at a right side position on a display screen if the operation user identifying unit determines that the performer of the gesture is the right side user, and is configured to display the reference image at a left side position on the display screen if the operation user identifying unit determines that the performer of the gesture is the left side user.

10. An information system comprising:

a camera located in front of two users who face forward and who are aligned side by side;

a gesture recognizing unit configured to recognize a gesture of a hand of a user based on an image captured by the camera;

an operation user identifying unit configured to determine whether a performer of the gesture recognized by the gesture recognizing unit is a right side user or a left side user;

a control unit configured to monitor recognition of a certain gesture defined to be an input start gesture and configured to accept an operation gesture as a user operation associated with the operation gesture when the input start gesture is recognized by the gesture recognizing unit, and executes a process corresponding to the accepted user operation; and wherein the control unit does not accept the operation gesture as the user operation if the user identified by the operation user identifying unit as the performer of the input start gesture is different from the user identified by the operation user identifying unit as the performer of the operation gesture.

11. A method for recognizing gestures in an information system, the information system including a camera located at a central position in a horizontal direction in front of two users who face forward and who are aligned side by side, the method comprising:

recognizing, by a gesture recognizing unit, a gesture of a hand of a user based on an image captured by the camera;

determining, by a determining unit, whether a central point in a width direction of an arm in a target image is at a right side or at a left side with respect to a center of the hand in the target image; and determining, using an operation user identifying unit, whether a performer of the gesture is a right side user if the central point in the width direction of the arm in the target image is at the right side with respect to the center of the hand and whether the performer of the gesture is a left side user if the central point in the width direction of the arm in the target image is at the left side with respect to the center of the hand.

12. The method according to claim 11, further comprising:

displaying the image captured by the camera in a display apparatus as a reference image; and wherein the reference image is displayed at a right side position on a display screen of the display apparatus if the performer of the gesture is the right side user and the reference image is displayed at a left side position on the display screen of the display apparatus if the performer of the gesture is the left side user.

13. The method according to claim 11, further comprising:

monitoring recognition of a certain gesture defined to be an input start gesture, and accepting an operation gesture as a user operation associated with the operation gesture when the input start gesture is recognized by the gesture recognizing unit, and executes a process corresponding to the accepted user operation; and wherein the control unit does not accept the operation gesture as the user operation if the user identified by the operation user identifying unit as the performer of the input start gesture is different from the user identified by the operation user identifying unit as the performer of the operation gesture.

14. The method according to claim 11, wherein the computer is mounted in an automobile;

wherein the two users include a user sitting on a driver seat of the automobile and a user sitting on a passenger seat of the automobile; and arranging the camera at a central position in the horizontal direction between the driver seat and the passenger seat in front of the driver seat and the passenger seat so as to capture a rear image.

15. A recording medium recording a computer program that is read and executed by a computer including a camera that is arranged at a central position in a horizontal direction in front of two users who face forward and who are aligned side by side so as to capture a rear image, the computer program causing the computer to function as:

a gesture recognizing unit that recognizes a gesture of a hand of a user in an image captured by the camera; and an operation user identifying unit that determines whether the hand the gesture of which is recognized enters an image capturing range of the camera from a right side or from a left side on the basis of an image that has been captured by the camera before the image including the gesture of the hand recognized by the gesture recognizing unit and determines that a performer of the gesture is a right side user if the hand enters the image capturing range of the camera from the right side and that the performer of the gesture is a left side user if the hand enters the image capturing range of the camera from the left side.

16. The recording medium recording the computer program according to claim 15, the computer program causing the computer to further function as:

a reference image display unit that displays the image captured by the camera in a display apparatus as a reference image, wherein the reference image display unit displays the reference image at a right side position on a display screen of the display apparatus if the operation user identifying unit determines that the performer of the gesture is the right side user and displays the reference image at a left side position on the display screen of the display apparatus if the operation user identifying unit determines that the performer of the gesture is the left side user.

17. The recording medium recording the computer program according to claim 15, the computer program causing the computer to further function as:

a control unit that monitors recognition of a certain gesture, which is set in advance as an input start gesture, by the gesture recognizing unit, accepts an operation gesture, which is recognized by the gesture recognizing unit, as a user operation associated with the operation gesture when the input start gesture is recognized by the gesture recognizing unit, and executes a process corresponding to the accepted user operation, wherein the control unit does not accept the operation gesture as the user operation if the user identified by the operation user identifying unit as the performer of the input start gesture is different from the user identified by the operation user identifying unit as the performer of the operation gesture.

18. The recording medium recording the computer program according to claim 15, wherein the computer is mounted in an automobile, wherein the two users are a user sitting on a driver seat of the automobile and a user sitting on a passenger seat of the automobile, and wherein the camera is arranged at a central position in the horizontal direction between the driver seat and the passenger seat in front of the driver seat and the passenger seat so as to capture a rear image.

19. A recording medium recording a computer program that is read and executed by a computer including a camera that is arranged at a central position in a horizontal direction in front of two users who face forward and who are aligned side by side so as to capture a rear image, the computer program causing the computer to function as:

a gesture recognizing unit that recognizes a gesture of a hand of a user in an image captured by the camera;

an operation user identifying unit that determines whether a performer of the gesture recognized by the gesture recognizing unit is a right side user or a left side user; and a reference image display unit that displays the image captured by the camera in a display apparatus as a reference image, wherein the reference image display unit displays the reference image at a right side position on a display screen of the display apparatus if the operation user identifying unit determines that the performer of the gesture is the right side user and displays the reference image at a left side position on the display screen of the display apparatus if the operation user identifying unit determines that the performer of the gesture is the left side user.

20. A recording medium recording a computer program that is read and executed by a computer including a camera that is arranged in front of two users who face forward and who are aligned side by side so as to capture a rear image, the computer program causing the computer to function as:

a gesture recognizing unit that recognizes a gesture of a hand of a user in an image captured by the camera;

an operation user identifying unit that determines whether a performer of the gesture recognized by the gesture recognizing unit is a right side user or a left side user; and a control unit that monitors recognition of a certain gesture, which is set in advance as an input start gesture, by the gesture recognizing unit, accepts an operation gesture, which is recognized by the gesture recognizing unit, as a user operation associated with the operation gesture when the input start gesture is recognized by the gesture recognizing unit, and executes a process corresponding to the accepted user operation, wherein the control unit does not accept the operation gesture as the user operation if the user identified by the operation user identifying unit as the performer of the input start gesture is different from the user identified by the operation user identifying unit as the performer of the operation gesture.

\* \* \* \* \*